UNITED STATES PATENT OFFICE.

CARL DITTMAR, OF BOSTON, MASSACHUSETTS, ASSIGNOR TO MARIA DITTMAR, OF SAME PLACE.

IMPROVEMENT IN EXPLOSIVE COMPOUNDS.

Specification forming part of Letters Patent No. 145,403, dated December 9, 1873; reissue No. 5,759, dated February 10, 1874; reissue No. 6,645, dated September 14, 1875; application filed May 22, 1875.

*To all whom it may concern:*

Be it known that I, CARL DITTMAR, of Boston, of the county of Suffolk and State of Massachusetts, have made a new and useful Improvement in Explosive Compounds, and in the manufacturing thereof, and the preparation of vegetable fiber for its conversion into such; and do hereby declare the same to be fully described in the following specification.

My invention is a new or improved article of manufacture, or explosive compound, made of vegetable fiber, converted into pulp and treated with acids, or such, and one or more other matters, as hereinafter set forth. It further consists in the art, mode, or process, hereinafter explained, of treating vegetable fiber for the purpose of rendering it explosive, such consisting in reducing the fiber to pulp, desiccating and reducing such pulp to grains or powder or compact forms, and treating such with acids or such, and one or more other materials, as hereinafter mentioned.

In carrying out my invention I make use of any suitable kind of vegetable fiber, whether it be in the raw or natural condition, or in a manufactured state, (as old linen or cotton rags, for instance,) and reduce such, by any well-known and suitable process, to a fine pulp. Mechanism usually adopted for making paper-pulp will generally suffice for the purpose of producing the pulp, which, in order to operate to the best advantage, should be produced in a way to render the vegetable fiber chemically pure or free from extraneous or foreign matter. After the pulp has been made it is to be desiccated, and cut up or reduced to grains or powder, to accomplish which it may be pressed into a sheet or sheets of suitable thickness, which are to be properly dried, and afterward subjected to the action of a punching, cutting, or grinding machine, capable of reducing the dry pulp to pieces, grains, or fine powder, as may be required. After this has been done the pulp in such a reduced state is to be treated with an acid or mixture of nitric and sulphuric acids, in the same way in which cotton is usually treated for converting it into the substance known as gun-cotton. During the drying process the pulp may be stirred, to prevent it from forming in too large lumps. Prior to or after the desiccating processes, and before subjecting it to the bath of nitric and sulphuric acids, the pulp may be soaked in a solution of sugar, mannite, amylum, or inuline, care being taken to clear it of superfluous acid, which may be effected by applying to it or soaking it in a solution of alkali or soda. It may also be soaked in a solution of nitrate or chlorate of potash, it being carefully dried after the application of the solution or solutions. After the subjection of the pulp to the action of the nitric and sulphuric acids, and its subsequent desiccation, it will be ready for use.

For improving the manufacture for blasting purposes it may be soaked in, or have poured upon or applied to it, a quantity of nitro-glycerine; or soda and saltpeter may be added, in a fine state, after the drying process.

The combination or mixture of the vegetable fiber with the sugar, mannite, amylum, or inuline produces a very powerful explosive compound, and overcomes the difficulty which results in preparing without the pulp either of such matters with acid or acids for conversion of it into an explosive material.

If desirable, the explosive powder or grains of pulp thus produced may be pressed into a mold or molds for being converted into charges or cartridges, which may be coated with waterproof varnish.

All the within-mentioned compounds, formed without the use of nitro-glycerine, can be used for the manufacture of fire-works, chiefly saloon and theater fire-works, as being better adapted for these purposes than common powder, in giving out neither smoke nor smell, and also for gunning or artillery purposes, in leaving no residuum and requiring no cleansing while in use.

All these compounds can be kept wet e any length of time, and therefore be stor d and transported with safety in the largest quantities, like common merchandise, or even better than that, being impossible to be set on fire or exploded by concussion. Before use it may be dried by spreading the compound out in the sun or in a warm room, or by any other drying process. The grains remain whole if kept under water, which it is not the case when gun-cotton is pulped and grained. Grains made by my process have also a greater resistance against any mechanical treatment by handling, transporting, &c., no dust resulting therefrom.

The different explosive compounds, manufactured in the different ways above described, may be mixed together in different proportions, so as to give different strength, as may be required. The different compounds may be mixed with prepared or unprepared charcoal.

In preparing the vegetable fiber in the manner above described, I make a very powerful explosive, combined with the greatest safety, as the fineness to which the vegetable fiber is reduced by the destruction of the vegetable texture before the treatment with chemicals allows a more thorough action of the chemicals, giving, therefore, more strength and uniformity; and, owing to the great elasticity of the material, it is safer than any other similar explosive. Being made up in grains, cylinders, or cartridges of any size or form, either coated or not coated with a water-proof material, ready for use, it is very convenient in practice.

Every one of the above-described compounds can be fired by means of a percussion-cap, or, like common powder, with a fuse, when well confined.

The vegetable fiber, prepared as herein described, is the best adapted substance to be combined with nitro-glycerine, as it takes and holds as much nitro-glycerine as the infusorial earth, having the preference of not leaving from twenty to twenty-five per cent. residuum, and adding to the strength of the compound, being resolved in gases by the explosion.

I claim as my invention—

1. The process, substantially as hereinbefore described, of treating vegetable fiber to render it explosive, consisting in converting the fiber to pulp, desiccating it and reducing it to grains, powder, or compact forms, and treating the same with nitric or nitric and sulphuric acids, all as explained.

2. The process of preparing vegetable fiber for treatment by acids or other specified materials to render it explosive, the said process consisting in reducing the fiber to pulp, and subsequently desiccating it, and reducing it to grains, powder, or compact forms.

3. The process described of treating vegetable fiber to render it explosive, which consists in converting the fiber into pulp, desiccating and reducing it to powder, grains, or compact forms, soaking it in a starchy or saccharine solution, and treating it with nitric or nitric and sulphuric acids and an alkaline solution, as set forth.

4. The process described of preparing vegetable fiber for being rendered explosive, which consists in converting it into pulp, drying it, and reducing it to grains, powder, or compact forms, treating it with nitric or nitric and sulphuric acids, and adding to it nitrate or chlorate of potash or nitro-glycerine, all as stated.

5. As a new or improved manufacture, the described explosive compound, consisting of starch, sugar, nitrate or chlorate of potash, or nitro-glycerine, and the granular or compact and acidined vegetable fiber, as hereinbefore set forth.

CARL DITTMAR.

Witnesses:
R. H. EDDY,
J. R. SNOW.